United States Patent
Chen et al.

(10) Patent No.: US 7,031,786 B2
(45) Date of Patent: Apr. 18, 2006

(54) SYSTEM AND METHOD FOR FABRICATION BACKUP PLANNING

(75) Inventors: Ju-Kau Chen, Changhua (TW); Chao-Fan Chang, Hsinchu (TW); Gwo-Chiang Fang, Pingjhen (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 117 days.

(21) Appl. No.: 10/809,568

(22) Filed: Mar. 25, 2004

(65) Prior Publication Data

US 2005/0216110 A1    Sep. 29, 2005

(51) Int. Cl.
*G06F 19/00* (2006.01)

(52) U.S. Cl. ...................................... 700/99
(58) Field of Classification Search ............ 700/79, 700/82, 86, 87, 99–102, 111, 121
See application file for complete search history.

(56) References Cited

U.S. PATENT DOCUMENTS

| | | | |
|---|---|---|---|
| 5,914,879 A * | 6/1999 | Wang et al. ............. | 700/111 |
| 6,341,240 B1 * | 1/2002 | Bermon et al. ........... | 700/97 |
| 6,574,521 B1 * | 6/2003 | Hsu ......................... | 700/99 |
| 6,678,566 B1 * | 1/2004 | Ho et al. .................. | 700/82 |
| 6,698,991 B1 * | 3/2004 | Bachrach et al. ......... | 414/217 |
| 2002/0165629 A1 * | 11/2002 | Ho et al. .................. | 700/82 |
| 2002/0165633 A1 * | 11/2002 | Hsu ......................... | 700/99 |

* cited by examiner

Primary Examiner—Maria N. Von Buhr
(74) Attorney, Agent, or Firm—Thomas, Kayden, Horstemeyer & Risley

(57) ABSTRACT

A backup planning device within a fabrication system. The backup planning device schedules backup operations between separately located fabrication facilities by introducing a virtual tool. The capacity of the virtual tool is combined into first capacity information of a tool group to generate second capacity information thereof accordingly. The first capacity information comprises capacity information of effective tools in the respective tool group, while the second capacity information comprises capacity information of effective tools plus the virtual tool thereof. A first manufacturing plan for the tool group is determined according to a master production schedule, a WIP profile, and the second capacity information thereof. A second manufacturing plan is determined according to the workload allocation of the virtual tool in the first manufacturing plan.

30 Claims, 7 Drawing Sheets

SYSTEM AND METHOD FOR FABRICATION BACKUP PLANNING

BACKGROUND

The present invention relates to a fabrication planning system and particularly to a fabrication planning system for scheduling fabrication backup operations in separately located fabrication facilities.

FIG. 1 is a schematic view showing a conventional fabrication system 100 containing Fabs 11 and 13, capable of fabricating semiconductor wafers. Fabs 11 and 13 are not identical in tool composition, but have similar and/or partially overlapping tool sets. Fabs 11 and 13 contain tool groups 11a~11n and 13a~13n, respectively. Tool groups 11a and 13a comprise tools 111 and 131, respectively. Tools in tool groups 11a~11n and 13a~13n are controlled by Manufacturing Execution Systems (MESs) 110 and 130, respectively. Although both Fabs 11 and 13 belong to fabrication system 100, they are not only geographically separated but also operate independently. Because of the independent operation, workloads allocated to Fab 11 cannot be processed in Fab 13, and vice versa. Even though Fab 13 is available as a backup, workload in Fab 11 remains idle when tool bottleneck occurs. Thus, some tools in Fab 13 may remain idle despite Fab 11 having wafer lots queued at a corresponding tool. The independent operation of Fabs 11 and 13 actually hinders the fabrication system 100 from optimum utilization.

While cross-Fab backup within a fabrication system is clearly desired, it is not routinely practiced due to great difficulty in coordinating capacity of independent fabrication facilities. Cross-Fab backup is presently planned and executed manually in the conventional fabrication system, which is an inefficient and mistake-prone process. Conventionally, planning for backup operation starts only when a tool bottleneck occurs. At the beginning of the backup planning stage, the backup demand of the bottlenecked tool is calculated according to WIP (work-in-process) profile and capacity of the bottlenecked tool. After the backup demand is determined, it is then determined whether a backup operation will be executed. Considerable communication is required when querying other Fabs for capable of providing backup support to the bottlenecked tool. Moreover, because backup planning starts only when a tool bottleneck occurs, latent tool bottlenecks are concealed. As a result, the backup operation cannot be arranged in advance, and the throughput of the Fab will be seriously hindered by the bottleneck.

Hence, there is a need for a fabrication system that addresses inefficient backup planning arising from the existing technology.

SUMMARY

It is therefore an object of the invention to provide a system and method for backup planning to enhance the overall utilization and throughput of a fabrication system. To achieve this and other objects, the present invention provides a system and method of identifying latent tool bottlenecks in advance.

According to the invention, a backup planning device is provided within a fabrication system. The fabrication system contains a plurality of separately located fabrication facilities, each of which comprises a plurality of tool groups, wherein each tool group comprises a plurality of tools.

The backup planning device schedules backup operations between the fabrication facilities by introducing a virtual tool into each of the tool groups. The capacity of the virtual tool is combined into first capacity information of the tool group to generate second capacity information thereof accordingly. The first capacity information comprises capacity information of effective tools in the respective tool group, while the second capacity information comprises capacity information of effective tools plus the virtual tool. A first manufacturing plan for the tool group is determined according to a master production schedule (MPS), a work-in-process (WIP) profile, and the second capacity information thereof. A second manufacturing plan is determined according to the workload allocation of the virtual tool in the first manufacturing plan.

The invention also provides a backup planning method for scheduling backup operations in the separately located fabrication facilities within the fabrication system mentioned above. First, first capacity information, a master production schedule, and a WIP profile of the tool group are provided. Second, a virtual tool is assigned to each of the tool groups. Then capacity of the virtual tool is combined into the first capacity information of the tool group to generate second capacity information thereof accordingly. Next, a first manufacturing plan for the tool group is determined according to the master production schedule, the WIP profile. Then, a second manufacturing plan is determined according to the workload allocation for the virtual tool in the first manufacturing plan.

The above-mentioned method may take the form of program code embodied in a computer readable tangible media. When the program code is loaded into and executed by a machine, the machine becomes an apparatus for practicing the invention.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The present invention will now be described with reference to FIGS. 2 to 5, which in general relate to a backup planning device within a fabrication system. While the preferred embodiment of the invention operates with semiconductor fabrication systems, it is understood that the type of article processed by the fabrication system is not critical to the present invention, and any fabrication system having fabrication facilities with overlapped tool sets may employ the present invention.

Figure 1:
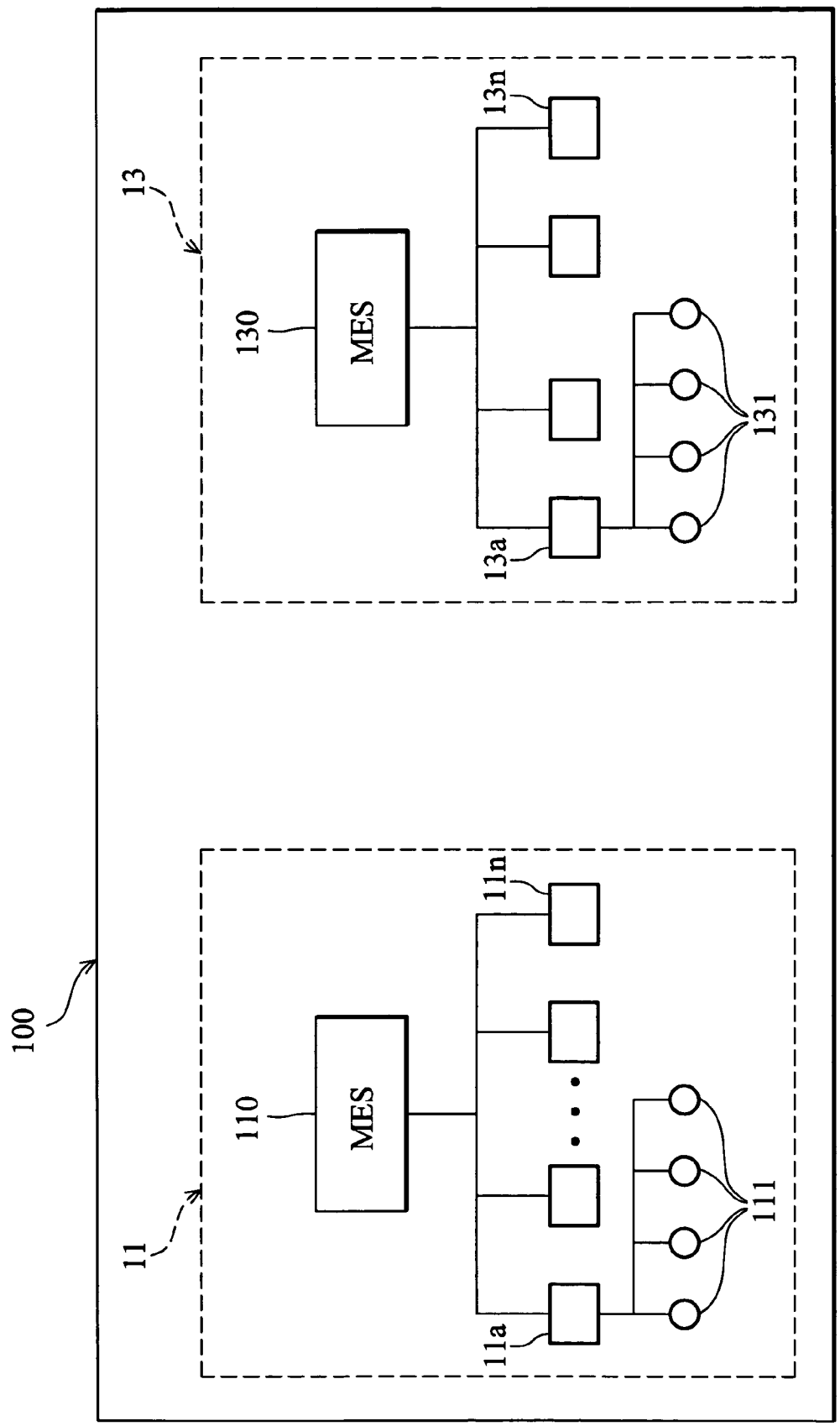
FIG. 1 is a schematic view of a conventional fabrication system.
Figure 2:
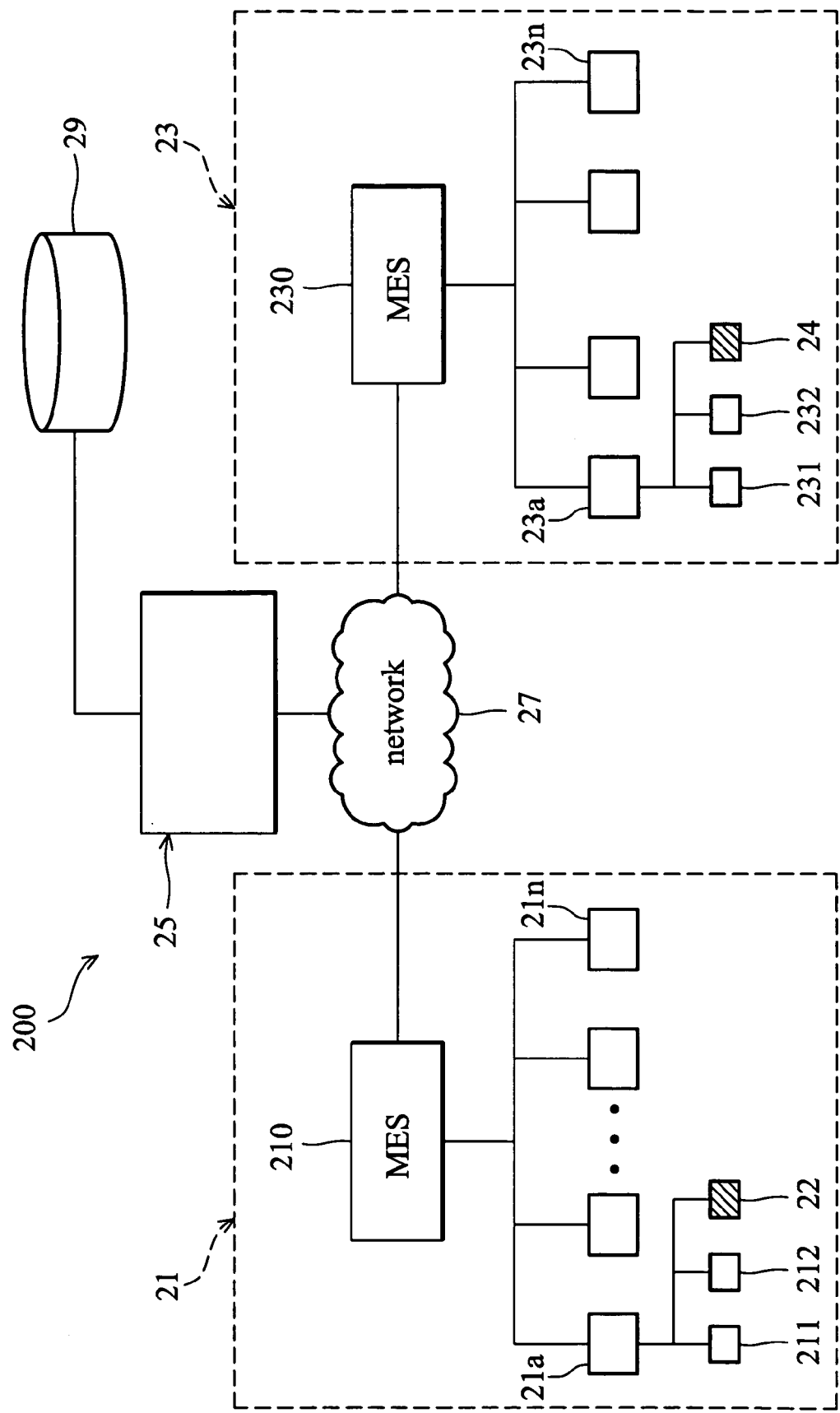
FIG. 2 is a schematic view of a fabrication system according to the present invention.

FIG. 2 is a schematic view of a fabrication system according to the present invention. The fabrication system 200 is a semiconductor fabrication system, and contains Fabs 21 and 23 and a backup planning device 25.

Each Fab comprises a plurality of tool groups, each of which comprises a plurality of tools for performing various wafer fabrication functions. In addition, each Fab comprises a manufacturing execution system (MES) for controlling the tools thereof. Fab 21, for example, contains MES 210 and tool groups 21a to 21n, wherein the tool group 21a comprises tools 211 and 212 for performing photolithography functions. Fab 23 contains MES 230 and tool groups 23a to 23n, wherein the tool group 23a comprises tools 231 and 232 for performing photolithography functions.

Backup planning device 25, coupled with MES 210 and MES 230 through a network 27, schedules backup operations between Fabs 21 and 23 by introducing a virtual tool into each of the tool groups. For example, virtual tools 22 and 24 are introduced to tool groups 21a and 23a, respectively. Database 29 stores actual capacity information of Fabs 21 and 23, wherein the actual capacity information specifies the effective capacity of tools 211, 212, 231, and 232, respectively. The capacity of the virtual tool for tool groups 21a and 23a to generate assumed capacity information of tool groups 21a and 23a, respectively. Assumed manufacturing plans for tool groups 21a and 23a are determined according to master production schedules, WIP profiles, and assumed capacity information thereof respectively. Proposed manufacturing plans for tool group 21a and 23a are determined according to the workload allocation for virtual tools 22 and 24 in the assumed manufacturing plans respectively.

Figure 3:
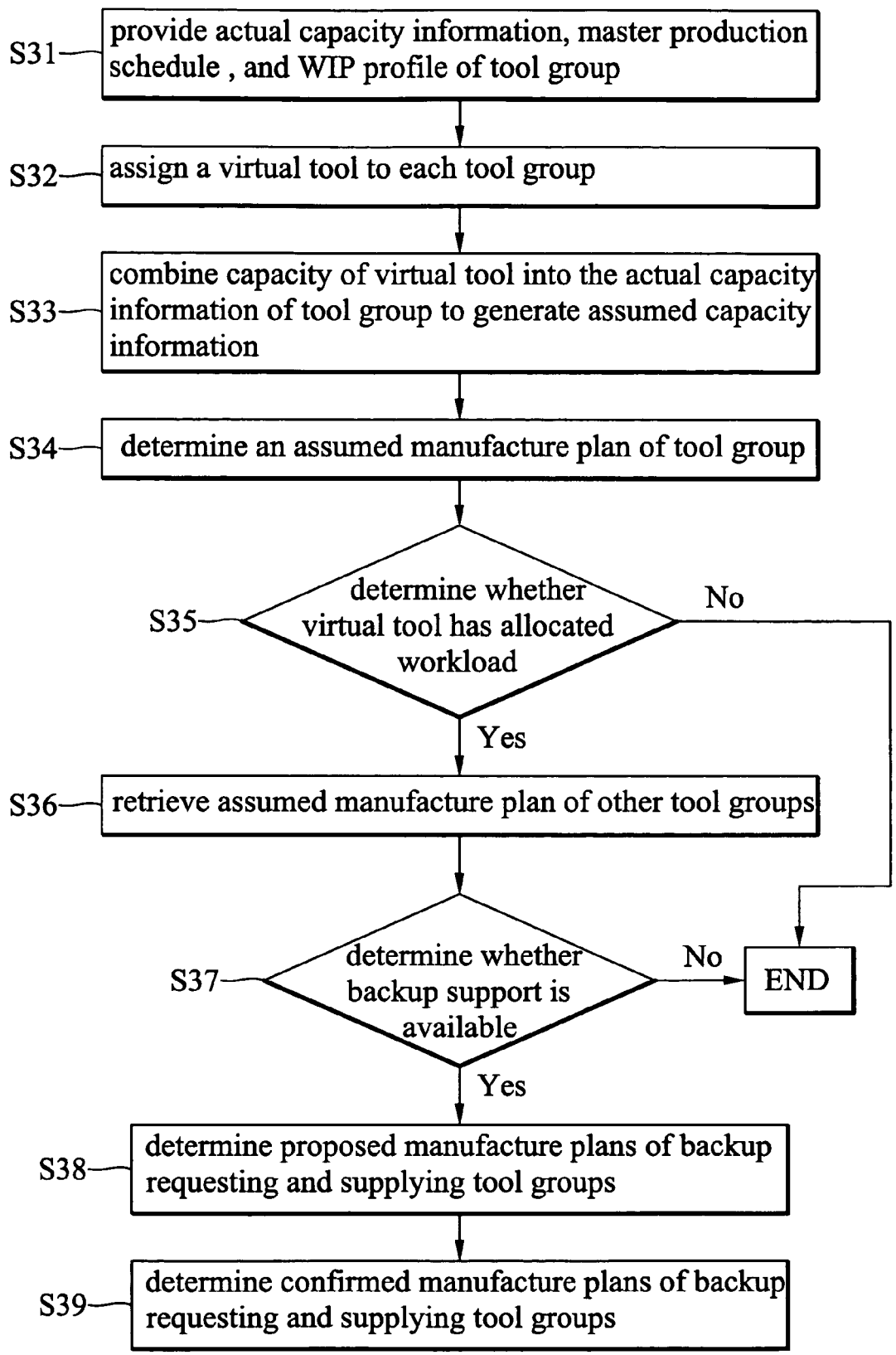
FIG. 3 is a flowchart of the backup planning method of the system in FIG. 2.

The invention also provides a backup planning method for scheduling backup operations in the separately located fabrication facilities within the fabrication system mentioned above. FIG. 3 is a flowchart of the backup planning method of the system in FIG. 2.

First, actual capacity information, a master production schedule, and a WIP profile for tool group 21a are provided (step S31). The actual capacity information of tool group 21a comprises capacity information of tools 211 and 212, which are effective and assumed to have equal capacity.

Second, virtual tool 22 is assigned to tool group 21a (step S32). Virtual tool 22 has unlimited capacity and is the least preferred tool in tool group 21a.

The capacity of virtual tool 22 is then combined into the actual capacity information of tool group 21a to generate assumed capacity information thereof accordingly (step S33).

Next, an assumed manufacturing plan for tool group 21a is determined according to the master production schedule, the assumed capacity information, and the WIP profile thereof (step S34).

Then, it is determined whether virtual tool 22 has allocated workload (step S35), and if so, tool group 21a is classified as a backup request tool group and the method proceeds to step S36, otherwise the procedure of the method is complete. Tool group 21a has a backup demand equal to the allocated workload of virtual tool 22.

In step S36, an assumed manufacturing plan for tool group 23a is retrieved, wherein tool groups 21a and 23a have overlapping tool sets as mentioned above.

Then, the assumed manufacturing plan for tool group 23a is checked to determine whether tool 231 or 232 is available to provide backup support for tool group 21a (step S37).

When tool 231 or 232 is available to backup tool group 21a, proposed manufacturing plans for tool groups 21a and 23a are determined according to the assumed manufacturing plans thereof (step S38).

In order to correctly represent the request and supply of backup operation in the manufacturing plans for tool groups 21a and 23a, the planned backup operation is incorporated into the manufacturing plans to generate confirmed manufacturing plans for tool groups 21a and 23a respectively (step S39). To represent the backup capacity received from tool group 23a, a simulated backup tool is added to tool group 21a, wherein the simulated backup tool has capacity equaling backup capacity received from tool group 23a. To represent the capacity offered for backup operation, tools 231 and 232 are allocated an equal share of workload gained in the backup operation.

Figure 4A:
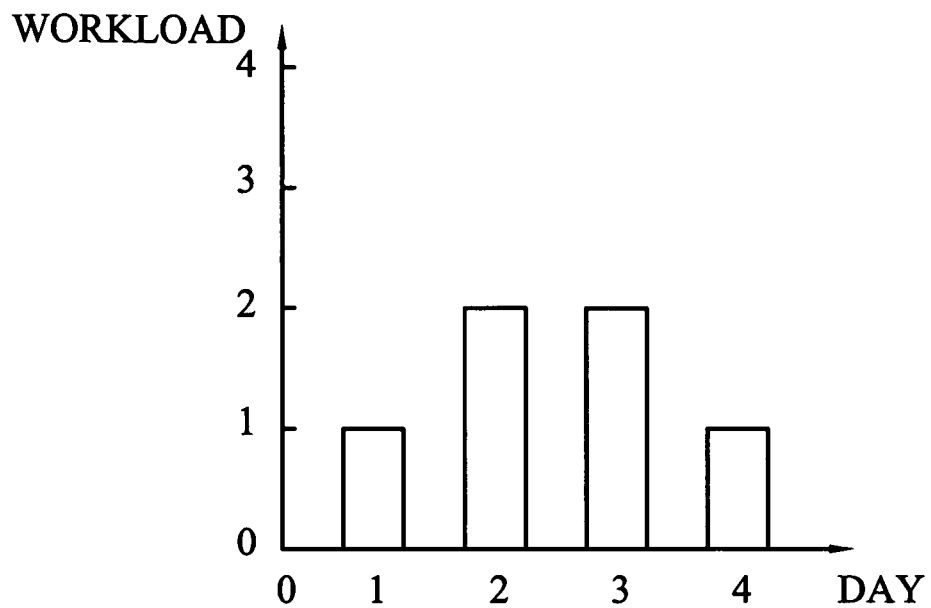
FIGS. 4A to 4E illustrate manufacturing plans for a tool group in accordance with the present invention.
Figure 4B:
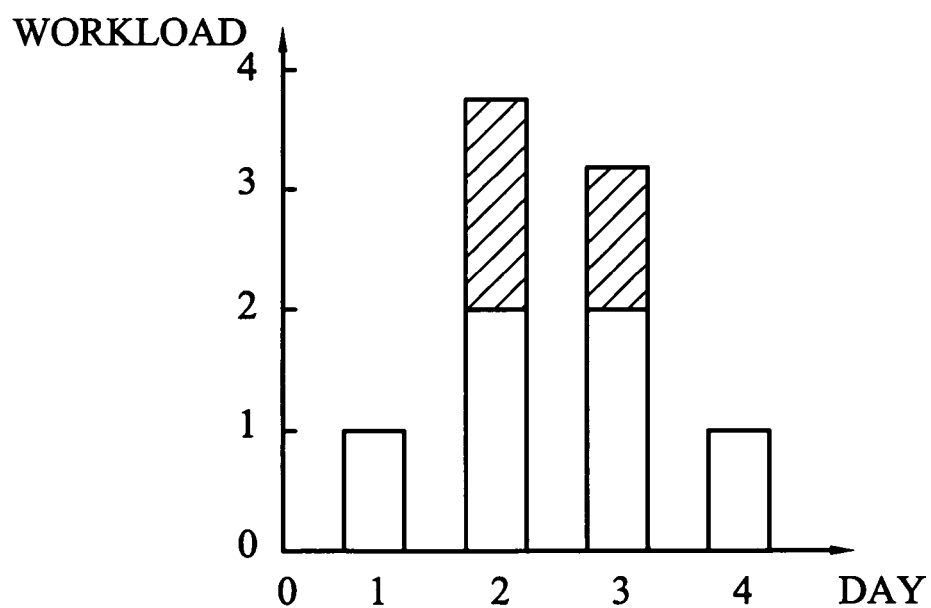

Additionally, to illustrate how the backup planning is achieved by incorporating virtual tools into the manufacturing scheduling, actual and assumed manufacturing plans for tool group 21a are shown in FIGS. 4A to 4E. FIG. 4A shows an actual manufacturing plan for tool group 21a before introducing virtual tool 22 thereto. The actual manufacturing plan is determined according to actual capacity information, master production schedule, and WIP profile of tool group 21a. As shown in the bar chart of FIG. 4A, on days 1 and 4, workload consumes capacity of one tool; on days 2 and 3, workload consumes capacity of two tools. As mentioned above, tool group 21a comprises two effective tools 211 and 212, thus the workload on days 2 and 3 exhausts the capacity of tool group 21a. The actual manufacturing plan shows allocated workload on each workday but not workload in excess of the effective capacity of tool group 21a. The queued workload is hidden from view in the manufacturing plan before introducing the virtual tool into tool group 21a. When virtual tool 22 is introduced into tool group 21a, tool group 21a has an assumed manufacturing plan as shown in FIG. 4B, wherein the shaded parts in the bar chart represent workload allocated to virtual tool 22. Because virtual tool 22 has unlimited capacity and is the least preferred tool in tool group 21a, the queued workload can be represented as workload allocated to virtual tool 22. Therefore, when workload is allocated to virtual tool 22, tool group 21a requires backup. Tool group 21a has a backup demand equal to the allocated workload of virtual tool 22.

Figure 4C:
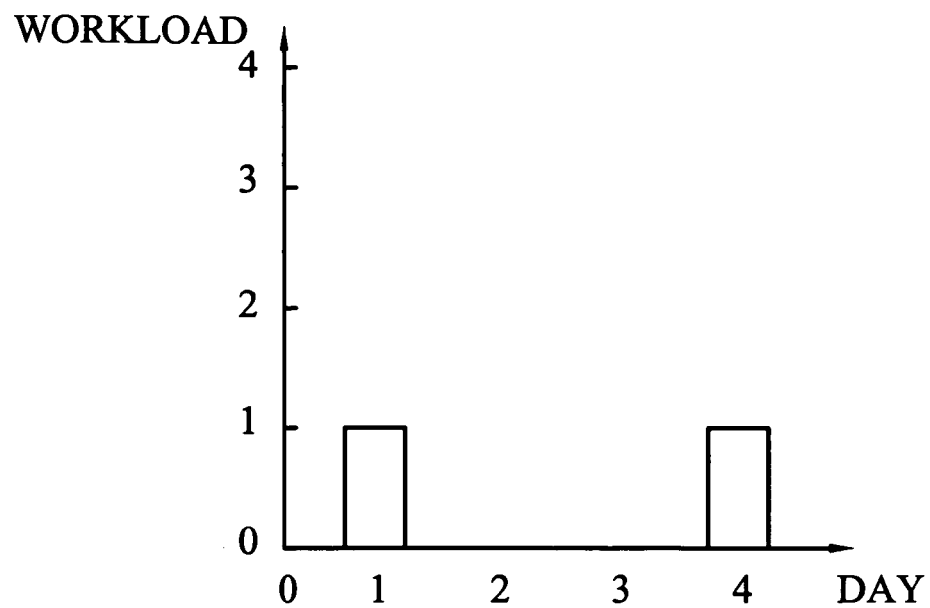

According to this embodiment, tool group 23a located in Fab 23 is the only possible source of backup support for tool group 21a, and tool group 23a has an assumed manufacturing plan produced according to the aforementioned method. Then, the assumed manufacturing plan for tool group 23a is checked to determine whether tool 231 or 232 is available to provide backup support for tool group 21a. FIG. 4C shows the assumed manufacturing plan for tool group 23a. As shown in the bar chart in FIG. 4C, on days 1 and 4, workload consumes capacity of one and two tools respectively, and virtual tool 24 has no allocated workload. Therefore, tool group 23a does not require backup support and can provide backup support on days 1, 2, and 3. When tool group 23a is available to backup tool group 21a, proposed manufacturing plans for tool groups 21a and 23a are determined according to the assumed manufacturing plans thereof. The proposed manufacturing plan specifies that queued workload of tool group 21a on days 2 and 3 is transferred to tool group 23a, processed there, and sent back to tool group 21a after the backup operation is complete.

Figure 4D:
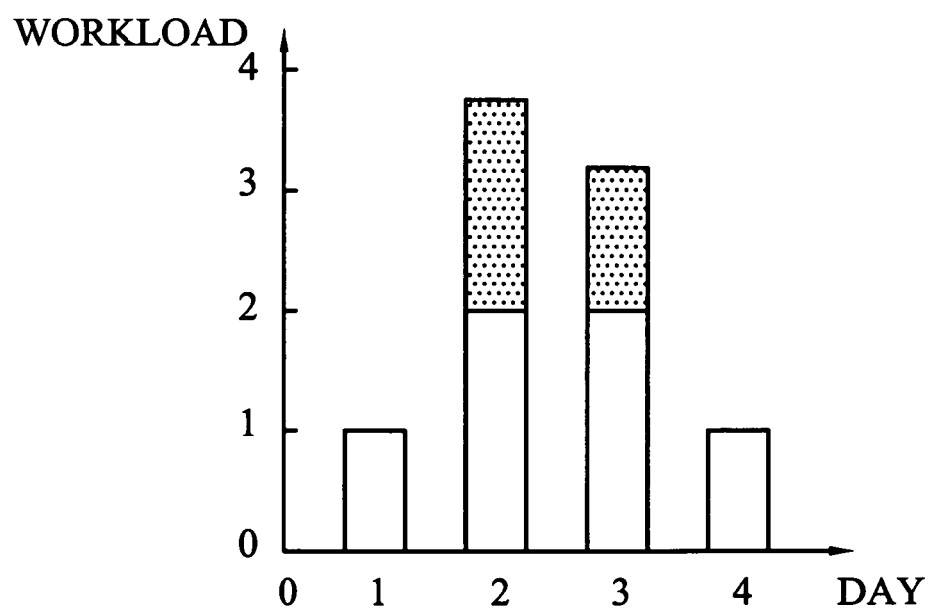
Figure 4E:
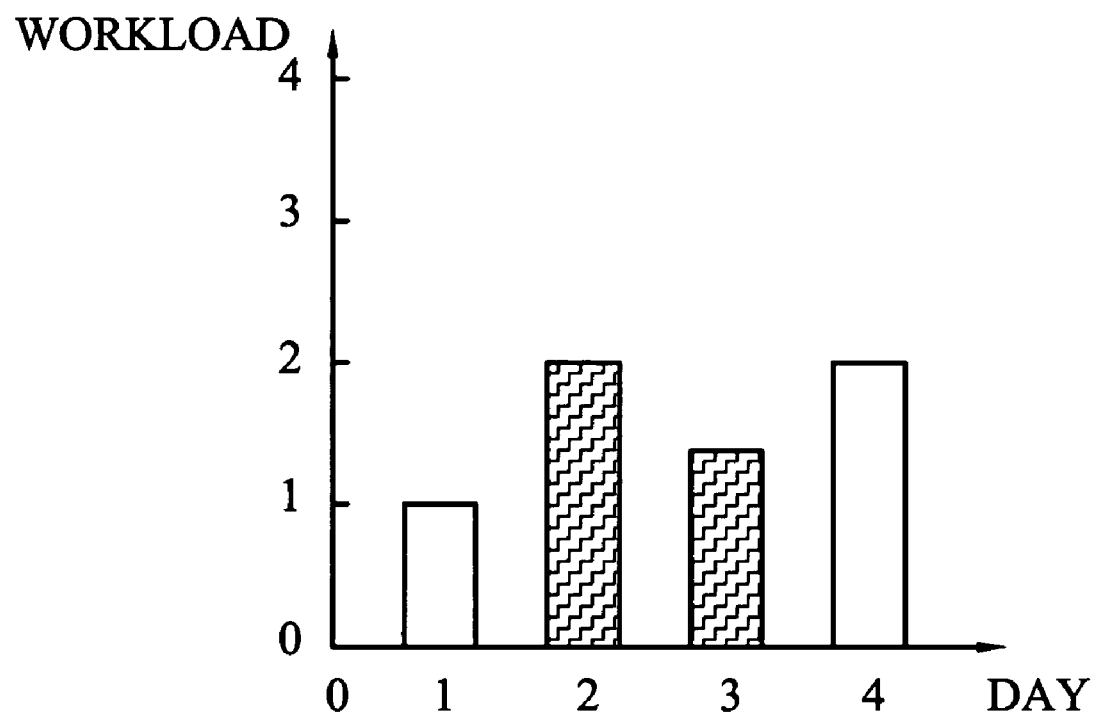

The proposed manufacturing plan, however, does not represent the request and supply of backup between tool groups 21a and 23a, thus the workload of tool groups 21a and 23a maybe incorrectly estimated. In order to correctly represent the request and supply of backup in the manufacturing plans for tool groups 21a and 23a, the planned backup operation is incorporated into the manufacturing plans to generate confirmed manufacturing plans for tool groups 21a and 23a respectively. To represent the backup capacity received from tool group 23a, a simulated backup tool is added to tool group 21a, wherein the simulated backup tool has capacity equaling backup capacity received from tool group 23a. The confirmed manufacturing plan for tool group 21a is shown in FIG. 4D, wherein the shaded part in the bar chart represents workload allocated to the simulated backup tool. To represent the capacity available for backup, tools 231 and 232 are allocated an equal share of workload gained in the backup operation. The confirmed manufacturing plan for tool group 23a is shown in FIG. 4E, wherein the shaded part in the bar chart represents workload obtained from tool group 21a.

The backup planning method implemented in the backup control system of the present invention, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 5:
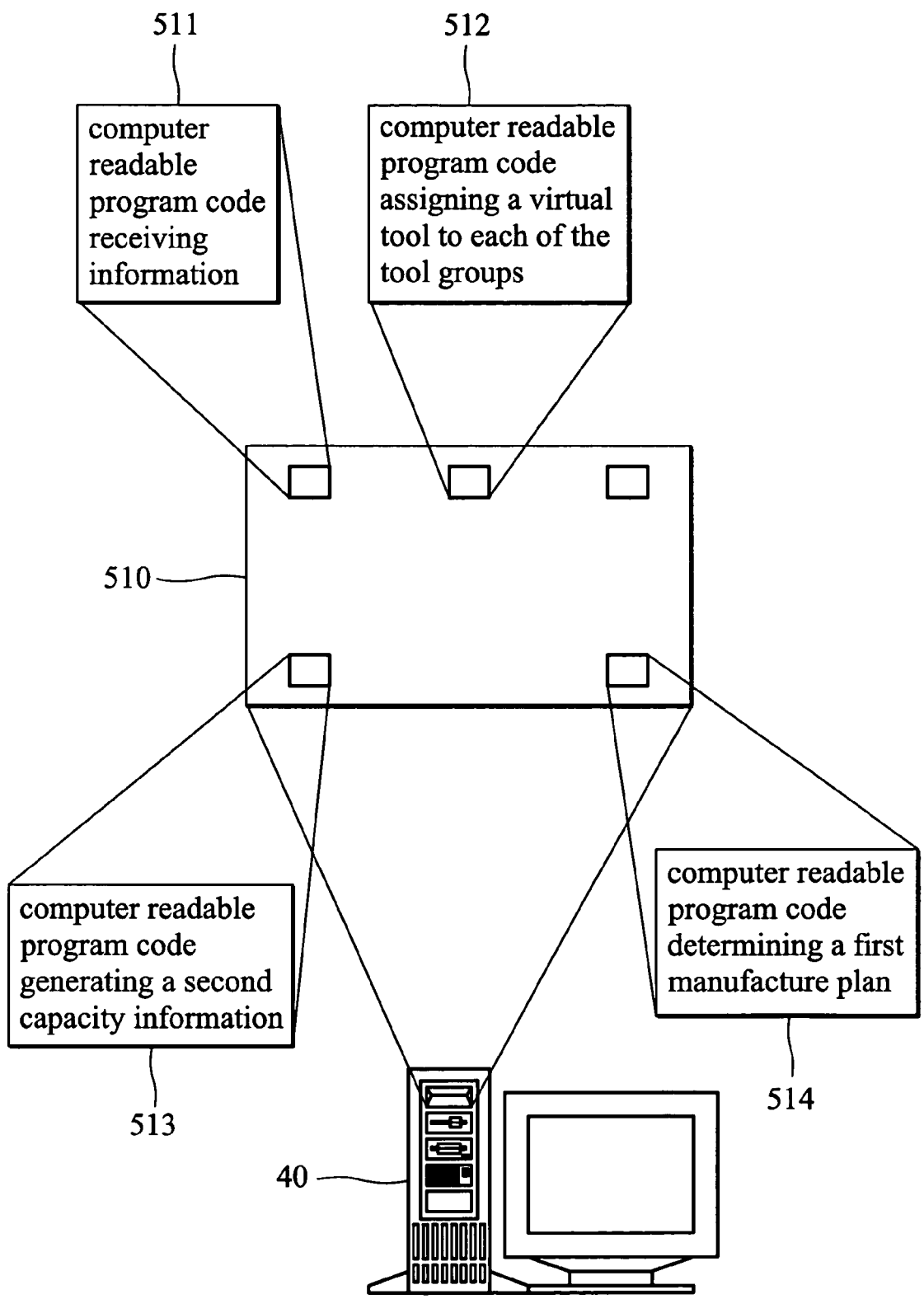
FIG. 5 is a diagram of a storage medium storing a computer program providing the backup planning method of the present invention.

FIG. 5 is a schematic diagram of a storage medium for a computer program providing the backup planning method according to the present invention. The computer program product includes a storage medium 510 having computer readable program code embodied in the medium for use in a computer system 500, the computer readable program code comprising at least computer readable program code 511 receiving first capacity information, a master production schedule, and a WIP profile of the tool group, computer readable program code 512 assigning a virtual tool to each of the tool groups, computer readable program code 513 combining capacity of the virtual tool into the first capacity information of the tool group to generate a second capacity information thereof accordingly, and computer readable program code 514 determining a first manufacturing plan for the tool group according to the master production schedule, the WIP profile, and the second capacity information thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fabrication system, comprising:
a plurality of fabrication facilities, each of which comprises a tool group, wherein each tool group comprises a plurality of tools; and
a backup planning device assigning a virtual tool to the tool group of each of the fabrication facilities, combining capacity of the virtual tool into first capacity information of the tool group to generate second capacity information thereof accordingly, determining a first manufacturing plan specifying workload allocation for the tools and virtual tool for the tool group according to a master production schedule, a WIP (work-in-process) profile, and the second capacity information thereof, and determining a second manufacturing plan specifying renewed workload allocation for the tools and virtual tool according to the workload allocation for the virtual tool in the first manufacturing plan.

2. The fabrication system of claim 1, wherein the virtual tool is assessed as having unlimited capacity and is defined as a least preferred tool in the tool group.

3. The fabrication system of claim 1, wherein the backup planning device further selects the tool group of one of the fabrication facilities as a backup requester according to the workload allocation of the virtual tool specified in the first manufacturing plan.

4. The fabrication system of claim 3, wherein the backup planning device further defines a backup demand, equal to the workload allocation of the virtual tool, of the backup requester according to the first manufacturing plan.

5. The fabrication system of claim 4, wherein the backup planning device further defines the tool group of one of the fabrication facilities as a backup supplier to fulfill the backup demand according to the first manufacturing plan, the backup demand, and the master production schedule.

6. The fabrication system of claim 5, wherein the backup planning device further allocates each of the tools of the backup supplier an equal share of the workload allocation specified in the backup demand.

7. The fabrication system of claim 5, wherein the backup planning device further introduces a simulated backup tool, having capacity equaling backup capacity received from the backup supplier, to the backup requester.

8. The fabrication system of claim 1, wherein the tool for semiconductor manufacturing.

9. A backup planning system scheduling backup operations in a manufacturing system, wherein the manufacturing system comprises a plurality of manufacturing facilities, each of which comprises a plurality of tool groups, and each tool group comprises a plurality of tools, the backup planning system comprising:
means for providing first capacity information, a master production schedule, and a WIP (work-in-process) profile of the tool group;
means for assigning a virtual tool to each of the tool groups;
means for combining capacity of the virtual tool into the first capacity information of the tool group to generate second capacity information thereof accordingly;
means for determining a first manufacturing plan for the tool group according to the master production schedule, the WIP profile and the second capacity information thereof; and
means for determining a second manufacturing plan according to the workload allocation of the virtual tool in the first manufacturing plan.

10. The system of claim 9, wherein the virtual tool is assessed as having an unlimited capacity and is defined as a least preferred tool in the tool group.

11. The system of claim 9, further comprising means for selects the tool group of one of the fabrication facilities as a backup according to the workload allocation of the virtual tool specified in the first manufacturing plan.

12. The system of claim 11, further comprising means for defines a backup demand, equal to the workload allocation of the virtual tool, of the backup requester according to the first manufacturing plan.

13. The system of claim 12, further comprising means for defines the tool group of one of the fabrication facilities as a backup supplier to fulfill the backup demand according to the first manufacturing plan, the backup demand, and the master production schedule.

14. The system of claim 13, further comprising means for allocating each of the tools of the backup supplier an equal share of workload allocation specified in the backup demand.

15. The system of claim 13, further comprising means for introducing a simulated backup tool, having capacity equaling backup capacity received from the backup supplier, to the backup requester.

16. A backup planning method, scheduling backup operations in a manufacturing system, wherein the manufacturing system comprises a plurality of manufacturing facilities, each of which comprises a plurality of tool groups, and each tool group comprises a plurality of tools, the method comprising:
   providing first capacity information, a master production schedule, and a WIP (work-in-process) profile of the tool group;
   assigning a virtual tool to each of the tool groups;
   combining capacity of the virtual tool into the first capacity information of the tool group to generate second capacity information thereof accordingly;
   determining a first manufacturing plan for the tool group according to the master production schedule, the WIP profile and the second capacity information thereof; and
   determining a second manufacturing plan according to the workload allocation of the virtual tool in the first manufacturing plan.

17. The method of claim 16, wherein the virtual tool is assessed as having an unlimited capacity and is defined as a least preferred tool in the tool group.

18. The method of claim 16, further selecting the tool group of one of the fabrication facilities as a backup requester according to the workload allocation of the virtual tool specified in the first manufacturing plan.

19. The method of claim 18, further defining a backup demand, equaling to the workload allocation of the virtual tool, of the backup requester according to the first manufacturing plan.

20. The method of claim 19, further defines the tool group of one of the fabrication facilities as a backup supplier to fulfill the backup demand according to the first manufacturing plan, the backup demand, and the master production schedule.

21. The method of claim 20, further allocating each of the tools of the backup supply tool group an equal share of workload gained in the backup operation.

22. The method of claim 16, further introducing a simulated backup tool, having capacity equaling backup capacity received from the backup supplier, to the backup requester.

23. The method of claim 16, wherein the tool is a semiconductor manufacturing tool.

24. A computer readable storage medium for storing a computer program providing a backup planning method implemented in a manufacturing system, wherein the manufacturing system comprises a plurality of manufacturing facilities, each of which comprises a plurality of tool groups, and each tool group comprises a plurality of tools, the method comprising:
   receiving first capacity information, a master production schedule, and a WIP (work-in-process) profile of the tool group;
   assigning a virtual tool to each of the tool groups;
   combining capacity of the virtual tool into the first capacity information of the tool group to generate a second capacity information thereof accordingly; and
   determining a first manufacturing plan for specifying renewed workload allocation for the tools and virtual tool for the tool group according to the master production schedule, the WIP profile, and the second capacity information thereof.

25. The storage medium of claim 24, wherein the virtual tool is assessed as having an unlimited capacity and is the least preferred tool in the tool group.

26. The storage medium of claim 24, further determining a backup request tool group according to the workload allocation of the virtual tool specified in the first manufacturing plan.

27. The storage medium of claim 24, further determining a backup demand, equaling to the workload allocation of the virtual tool, of the backup request tool group according to the first manufacturing plan.

28. The storage medium of claim 24, further defining the tool group of one of the fabrication facilities as a backup supplier to fulfill the backup demand according to the first manufacturing plan, the backup demand, and the master production schedule.

29. The storage medium of claim 24, further allocating each tool of the backup supplier an equal share of workload gained in the backup operation.

30. The storage medium of claim 24, further introducing a simulated backup tool, having capacity equaling backup capacity received from the backup supplier, to the backup requester.

* * * * *